INVENTORS
GEORGE B. UPHAM
FERNAND MAYER
GEORGES LOUIS

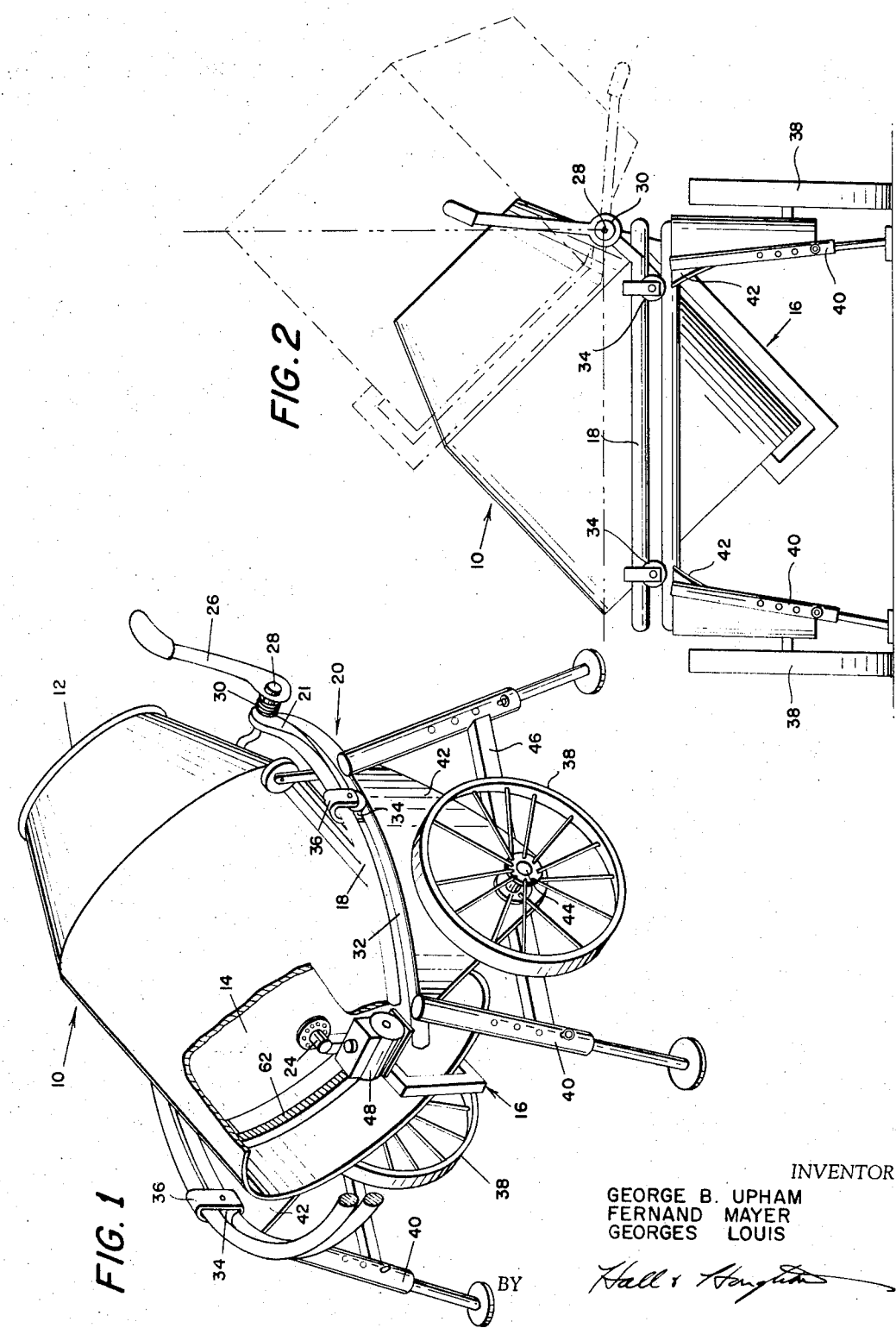

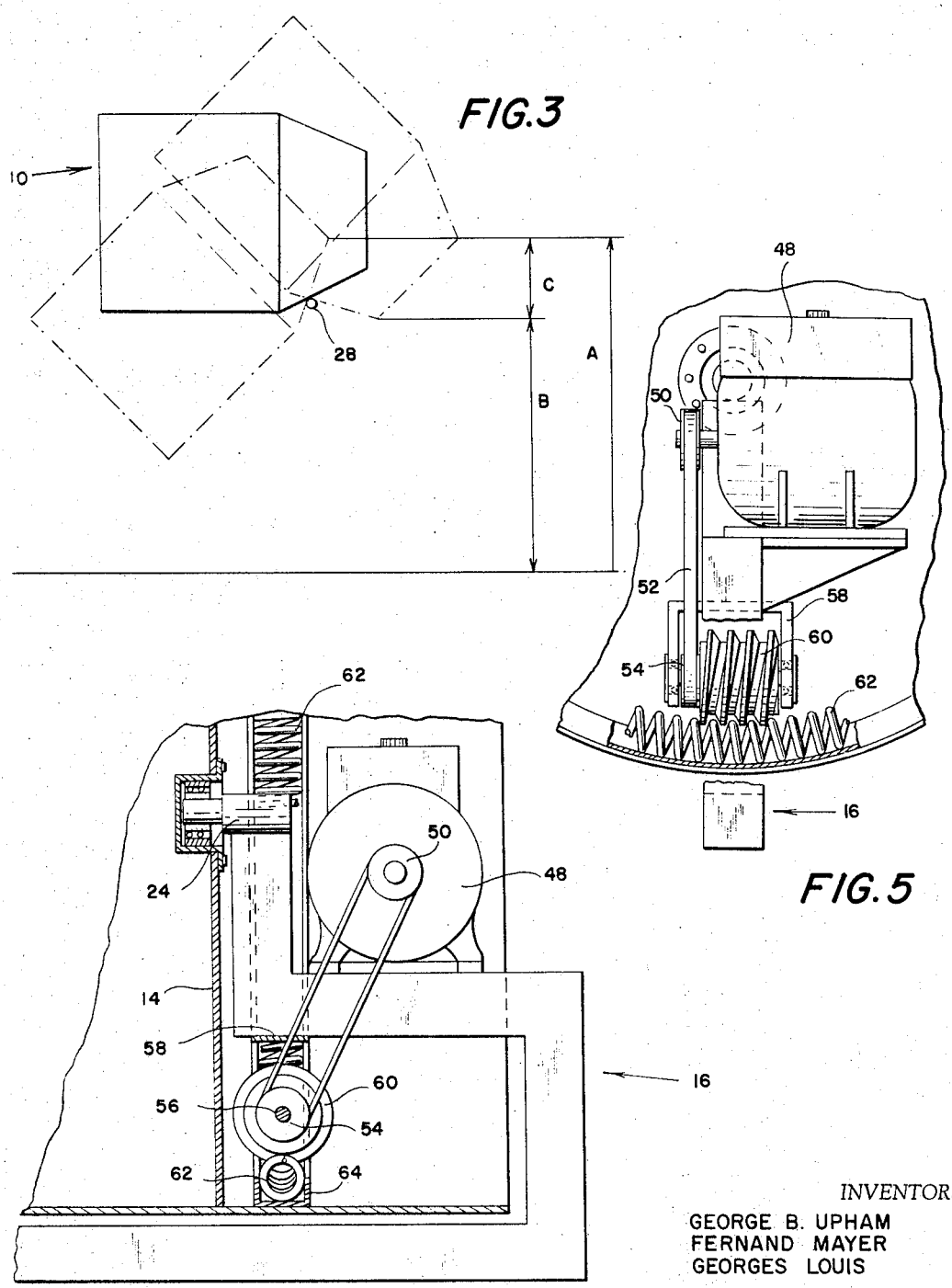

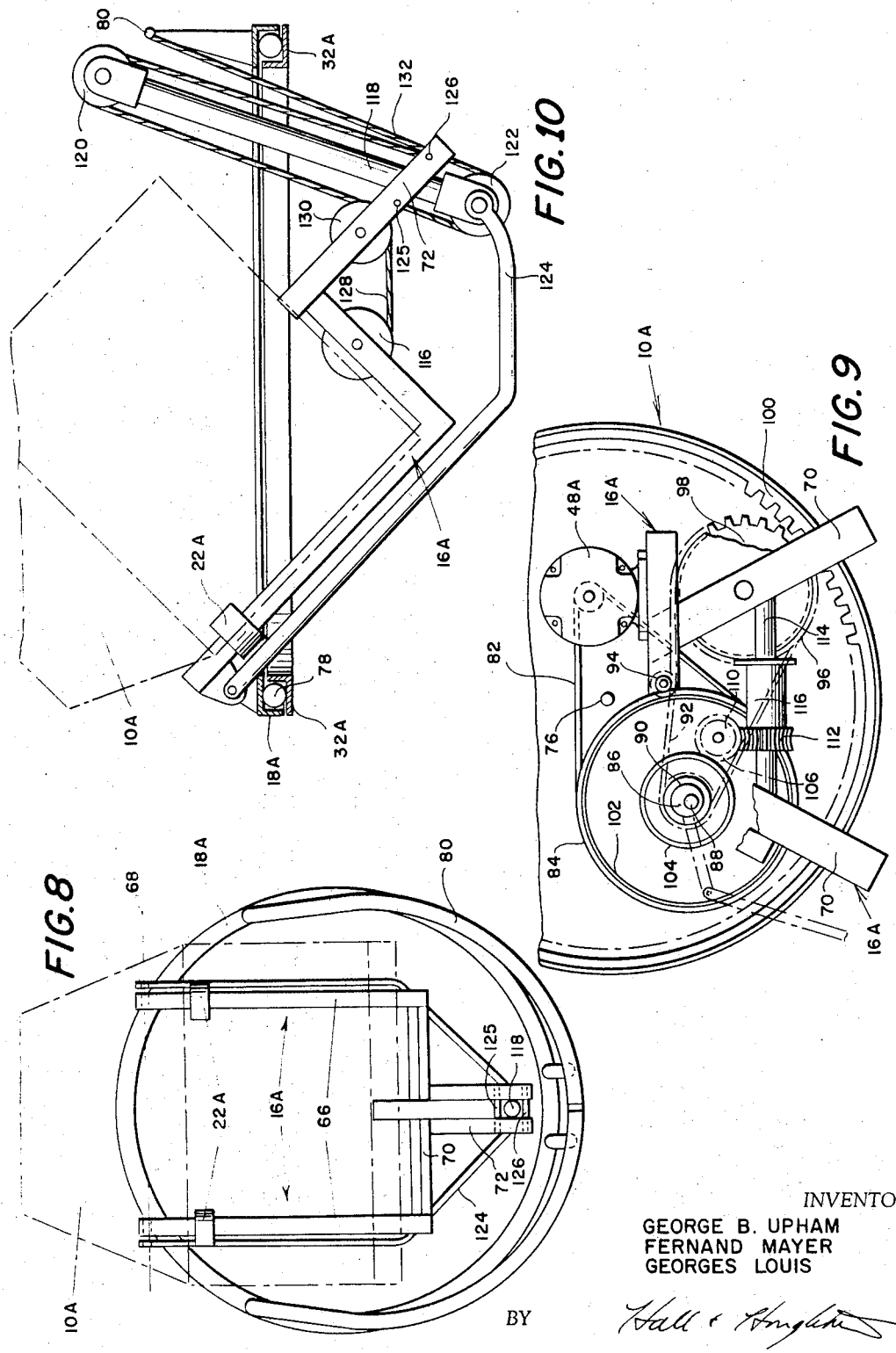

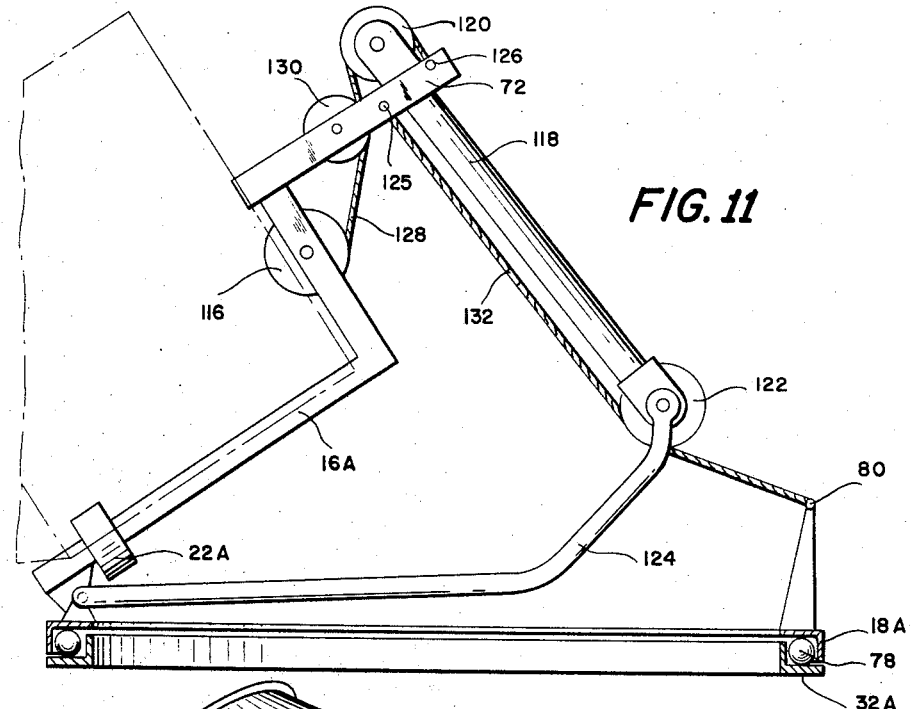
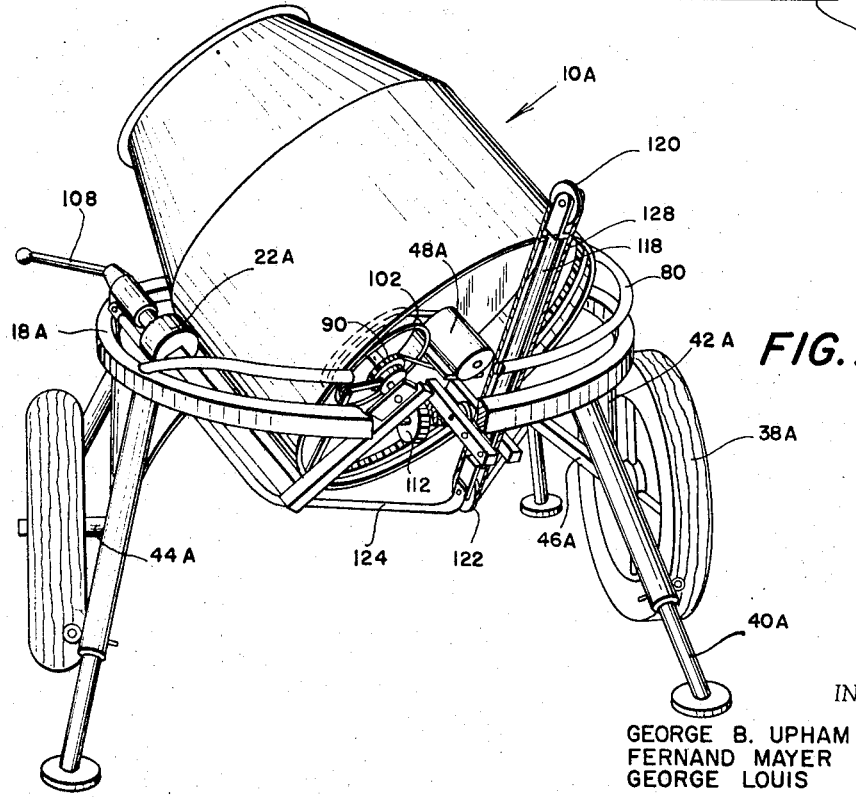

INVENTORS
GEORGE B. UPHAM
FERNAND MAYER
GEORGES LOUIS

BY

ATTORNEYS

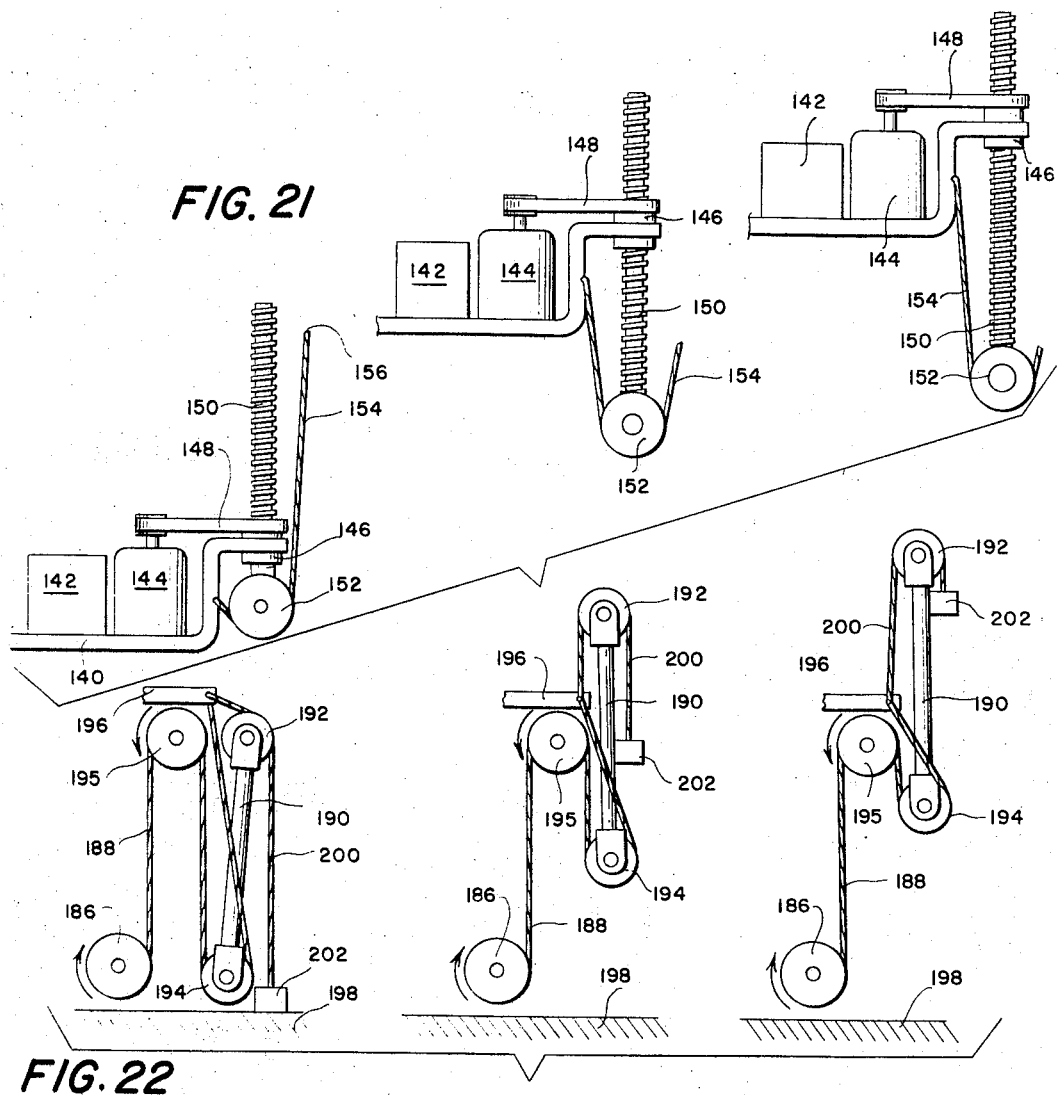
FIG. 21
FIG. 22
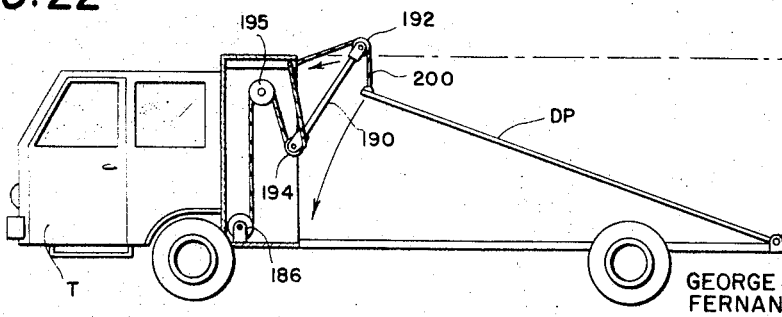
FIG. 23

INVENTORS
GEORGE B. UPHAM
FERNAND MAYER
GEORGES LOUIS

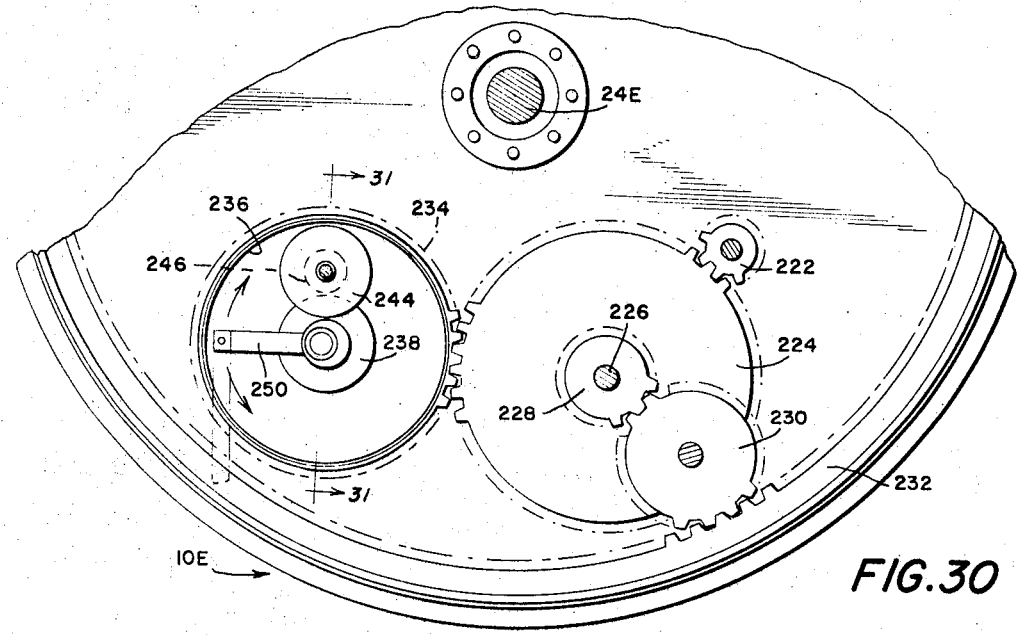
FIG.30
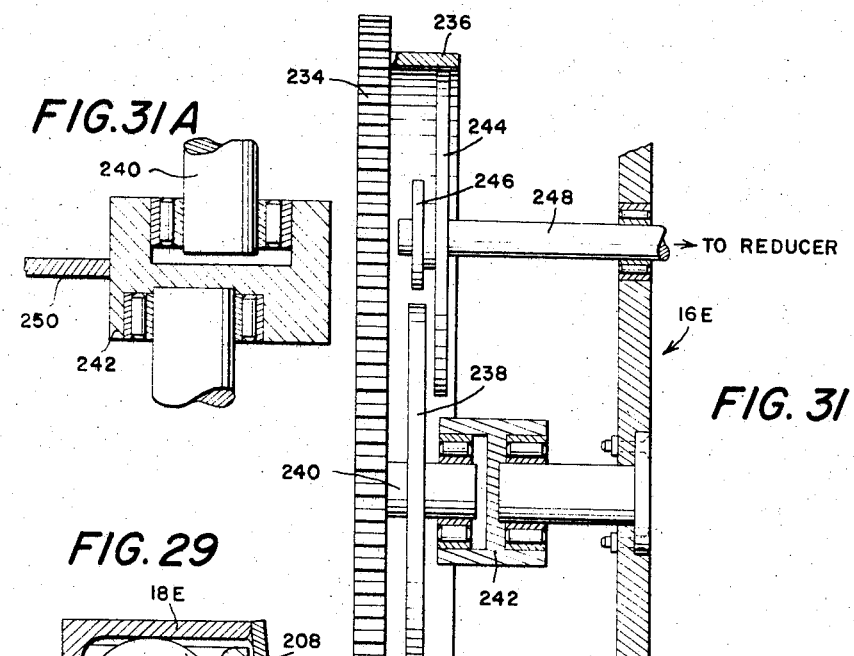
FIG.31A
FIG.31
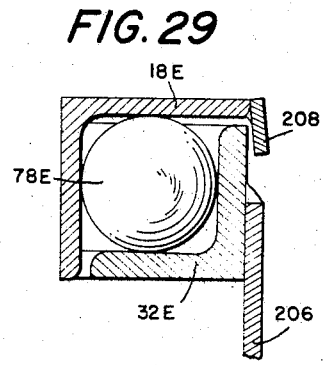
FIG.29
INVENTORS
GEORGE B. UPHAM
FERNAND MAYER
GEORGES LOUIS
BY *Hall & Houghton*
ATTORNEYS

United States Patent Office 3,424,440
Patented Jan. 28, 1969

3,424,440
MIXING APPARATUS
George B. Upham, Fernand Mayer, and Georges Louis, Paris, France, assignors to Recherches et Mecanique (R.E.M.) Societe Anonyme, Sucy-en-Brie, Val-de-Marne, France
Filed Apr. 20, 1964, Ser. No. 361,108
U.S. Cl. 259—171    29 Claims
Int. Cl. B28c 5/18, 7/16

This invention relates to material handling apparatus, and more particularly to apparatus for supporting and transporting a container (such as the drum of a concrete mixer), for moving the container in azimuth and elevation, and for rotating the container about its axis. While the invention is particularly concerned with apparatus for mixing or agitating milk, concrete, grain, or other material, certain principles of the invention are applicable to other types of apparatus in which it is desired to move a load in azimuth through 360° and/or to move the load in elevation about a generally horizontal tilt axis, and/or to rotate the load about its axis, or to lift the load. For illustrative purposes the invention will be described with respect to a specific application, namely a mixer for concrete or the like, and the applicability of the principles of the invention to other types of apparatus will become apparent as the description proceeds.

It is accordingly a principal object of the invention to provide improved apparatus for supporting and moving a container or the like.

Another object of the invention is to provide improved apparatus for orienting a container or the like in azimuth through 360° and for tilting the container in elevation, so that the container may be readily filled and emptied in any selected position.

A further object of the invention is to provide apparatus for supporting a tiltable container in which the container may be lowered practically to ground level for filling.

Another object of the invention is to provide apparatus for tiltably supporting a container in which the mouth of the container may be displaced very little between its filling and emptying positions.

Yet another object of the invention is to provide apparatus of the foregoing type in which the mouth of the tiltable container is maintained high enough to permit the container to be readily empted into a variety of receivers.

A further object of the invention is to provide apparatus for supporting a container or the like in which the position of the container is lower for filling than for emptying.

Still another object of the invention is to provide mixing apparatus or the like in which the drive mechanism is shielded by an extension of the wall of the mixing container.

An additional object of the invention is to provide apparatus for tiltably supporting a container or the like in which the tilt drive mechanism, which may also rotate the container, is tiltable with the container.

A further object of the inventon is to provide an improved chassis for supporting a container or the like, and in particular, a chassis which is substantially completely open at its interior so as to permit unencumbered tilting movement ofthe container or the like.

A further object of the invention is to provide an improved ring-shaped chassis.

Another object of the invention is to provide improved apparatus for supporting a chassis upon wheels while maintaining full clearance interiorly of the chassis.

An additional object of the invention is to provide improved apparatus for supporting a container or the like tiltably, and preferably also for axial rotation, and which permits tilting of the container with minimum physical effort.

Yet another object of the invention is to provide an improved interior drive mechanism for rotating a container or the like.

An additional object of the invention is to provide an improved chassis for supporting a container or the like for azimuthal rotation about an inclined axis.

A further object of the invention is to provide apparatus of the last-mentioned type in which azimuthal movement of a load is facilitated by preselection of the location of the center of gravity relative to the axis of rotation.

Yet another object of the invention is to provide apparatus of this type in which a container is re-oriented in azimuth automatically depending upon whether the container is full or empty.

An additional object of the invention is to provide an improved chassis for a cement mixer or the like having adjustable legs which may serve as stabilzing supports or which may form a trailer hitch for movement of the apparatus over the road.

Yet another object of the invention is to provide improved apparatus for lifting a load.

A still further object of the invention is to provide apparatus of the foregoing type in which the drive mechanism is lifted along with the load.

A further object of the invention is to provide apparatus of the foregoing type including unique cable tender arrangements.

Another object of the invention is to provide improved lifting apparatus employing a floating cable tender.

Still another object of the invention is to provide lifting apparatus employing a cable tender, such as a pole having a pulley at one end or at both ends, in which the cable tender is lifted concurrently with the lifting of a load and in which the orientation of the cable tender may follow the orientation of the load.

Yet another object of the invention is to provide lifting apparatus of the foregoing type in which the orientation of one or more cables is maintained substantially parallel to the cable tender.

A still further object of the invention is to provide lifting apparatus employing one or more cables in conjunction with a rigid cable tender which is lifted along with the load and which is of fixed length.

A further object of the invention is to provide lifting apparatus having simplicity, economy, and minimum space requirements, and capable of efficient operation, particularly where the orientation of the load is variable.

Briefly stated, and in accordance with one aspect of the invention, a container, such as the drum of a concrete mixer, is supported upon a cradle which is mounted upon a turret ring for tilting movement about a generally horizontal axis adjacent to the mouth of the container. The ring in turn is supported for azimuthal rotation upon a chassis. The chassis is constructed so as to maintain full interior freedom for tilting movement of the container. The container is tiltable from a lowered positioned at which the bottom of the container depends through the turret ring almost to ground level, and a raised position in which the container is inverted with the bottom substantially above the turret ring. The drive mechanism for tilting the cradle, and preferably also for rotating the container or rotatable elements thereof, is supported upon the cradle behind the container and moves with the container as the cradle is tilted, thereby preserving full freedom of movement within the chassis for azimuthal rotation, elevational tilting, and axial rotation of the container.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 1 is a perspective view, partially broken away, illustrating a first embodiment of the invention;

FIGURE 2 is a side elevation view illustrating the embodiment of FIGURE 1 in two positions;

FIGURE 3 is a diagrammatic elevation view illustrating the tilting movement of a container in accordance with the invention;

FIGURE 4 is a fragmentary vertical sectional view illustrating one form of drive mechanism in accordance with the invention;

FIGURE 5 is a fragmentary horizontal sectional view illustrating the drive mechanism of FIGURE 4;

FIGURE 8 is a diagrammatic plan view illustrating the relationship of container, cradle, and chassis in the embodiment of FIGURE 7;

FIGURE 9 is a fragmentary end elevation view illustrating one form of drive mechanism for rotating the container upon its axis and for tilting the container;

FIGURE 10 is a vertical, sectional, somewhat diagrammatic view illustrating a lifting mechanism of the invention in a first position;

FIGURE 11 is a view similar to FIGURE 10 illustrating the mechanism in another position;

FIGURE 12 is a perspective view illustrating the embodiment of FIGURES 7–11;

FIGURES 18–22 are diagrammatic elevation views illustrating further embodiments of the lifting mechanism of the invention in different positions;

FIGURE 23 is a partially diagrammatic side elevation view illustrating the application of a lifting mechanism of the invention to the movement of the dumping platform of a vehicle;

FIGURE 29 is an enlarged sectional view taken along line 29—29 of FIGURE 26 in the direction of the arrows and illustrating a detail of the chassis;

FIGURE 30 is a fragmentary rear elevation view illustrating details of the drive mechanism of the embodiment of FIGURE 26;

FIGURE 31 is a sectional view taken along line 31—31 of FIGURE 30 in the direction of the arrows;

FIGURE 31A is a sectional view of a detail; and

Figure 6:
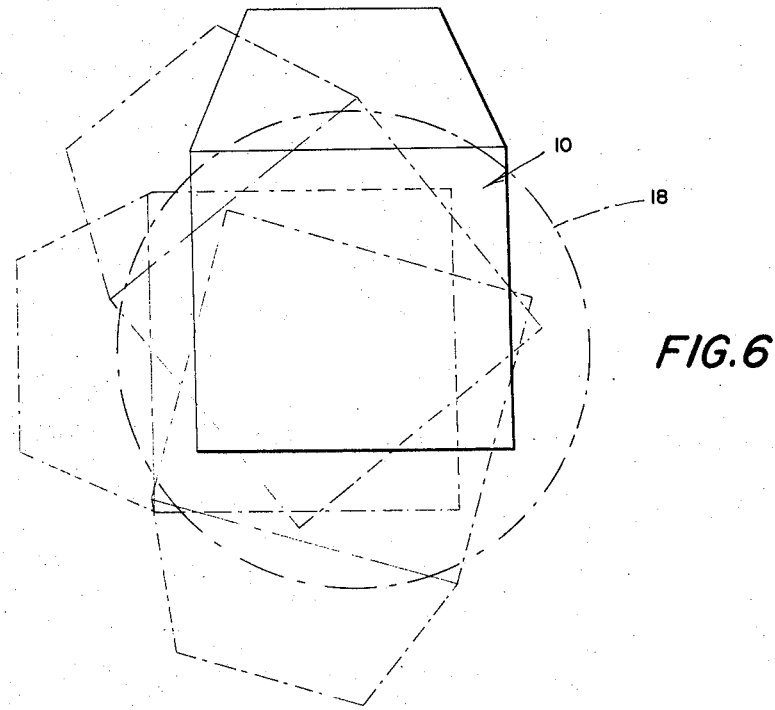
FIGURE 6 is a diagrammatic plan view illustrating the manner in which a container may be moved in azimuth according to the invention.

Referring to the drawings, and initially to FIGURE 1 thereof, container 10, which may be the drum of a concrete mixer, for example, is preferably in the form of a surface of revolution, such as a cylinder having a truncated conical extension leading to an open mouth 12 at the top of the container, the bottom 14 being closed. The side wall of the container is extended beyond the bottom wall for a purpose which will become apparent hereinafter. The container is supported upon a cradle 16 (see FIGURE 2), which is tiltably supported upon the turret ring 18 of a chassis 20. The construction of preferred forms of the cradle and the supporting chassis will be set forth in greater detail in connection with other embodiments to be described hereinafter. It suffices to state here that the cradle is provided with suitable bearings at one end thereof for supporting the cradle upon the turret ring 18, as by means of the brackets 21, for tilting movement of the cradle about a generally horizontal axis. The cradle supports a pair of rollers 22, one at each side thereof, which engages the side wall of the drum 10 and support the mouth end of the drum for rotation about the axis of the drum, which is preferably parallel to the axes of the rollers 22. The bottom end of the drum is rotatably supported upon a central arbor 24 and bearings as shown in FIGURE 4, the cradle being shaped so as to enter the open end of the side wall extension. The cradle may be tilted by means of a handle 26 fixed to the cradle of the tilt pivot shaft 28. In order to facilitate upward tilting of the cradle, especially when the container is loaded, a torsion spring 30 may be wound about shaft 28 so as to exert a torque between the turret ring 18 and the cradle tending to counterbalance the mass of the container.

The chassis 20 has a fixed ring 32 upon which the turret ring 18 is supported for 360° azimuthal rotation, as by rollers 34 rotatably supported in yokes 36 upon the turret ring. In the form shown, ring 32 is supported upon wheels 38 at opposite sides thereof, for transporting the apparatus from place to place, and in addition is preferably provided with adjustable support legs 40 for stabilizing the apparatus at a selected site. The legs may telescope and may be fixed at selected lengths by means of well known adjustable stops.

In order to support the chassis upon the wheels 38 and yet to maintain full interior clearance for movement of the cradle and the container, the chassis is provided with a pair of plates 42 which are fixed to and depend from the ring 32 for supporting stub axles 44 extending laterally outwardly from the plates to receive the wheels 38. Plates 42 are preferably of generally triangular configuration in elevation and are curved azimuthally so as to conform to the circular configuration of the ring 32. Preferably also the plates are braced to the legs 40 by means of horizontal members 44. The resultant structure is strong and light-weight, and yet preserves full interior clearance with respect to the cylindrical space defined by the chassis rings. The use of tubular structural members in the apparatus of the invention also promotes weight reduction.

While the drum 10 is shown as being rotatable about its axis, a drum may be employed in which internal elements are rotated relative to the drum wall. The drive motor 48 and drive train are preferably supported within the extension of the side wall of the drum. The motor may be supported upon the portion of the cradle extending into the drum extension, as shown in FIGURE 4, and may be any suitable type, such as a small gasoline engine or an electric motor. In the form shown the drive shaft of the motor has a pulley 50 which drives a belt 52, which in turn drives a pulley 54 fixed to a shaft 56, which rotates in a yoke 58 (FIGURE 5) depending from the cradle. Fixed to the same shaft is a worm gear 60, which may be formed of nylon, for example, and which meshes with a ring gear 62 mounted concentrically within the extension of the side wall of the drum. The ring gear may be constituted by a metal coil spring fixed within a channel 64 secured to the drum wall as shown in FIGURE 4. It is apparent that when the motor is energized the worm 60 will drive the ring gear 62, causing axial rotation of the drum.

The location of the drive mechanism in the manner shown and described preserves full clearance within the chassis for tilting movement of the drum, shields the operator from the drive mechanism, protects the drive mechanism (particularly during loading of the container), lowers the center of gravity of the apparatus (for stability during high speed movement over the road), and is economical. The drum is free to be loaded and unloaded in any azimuthal direction by rotating the turret ring 18 upon the fixed ring 32, as illustrated diagrammatically in FIGURE 6. Moreover, the drum is free to tilt through 90°, for example, as illustrated in FIGURE 2.

Because the tilt axis is placed adjacent to the mouth of the container and because the container is free to drop substantially through the turret ring, a low filling height, as shown in the solid line position of FIGURE 2, is attained along with a high emptying height, as shown in the phantom line position of FIGURE 2. The container may thus be conveniently filled and yet is high enough to permit discharge of the contents of the container into a variety of receivers, such as wagons or other vehicles. As shown in FIGURE 3, the position of the mouth of the container at the loading height A differs from the position at the unloading height B by the relatively small amount C.

Figure 7:
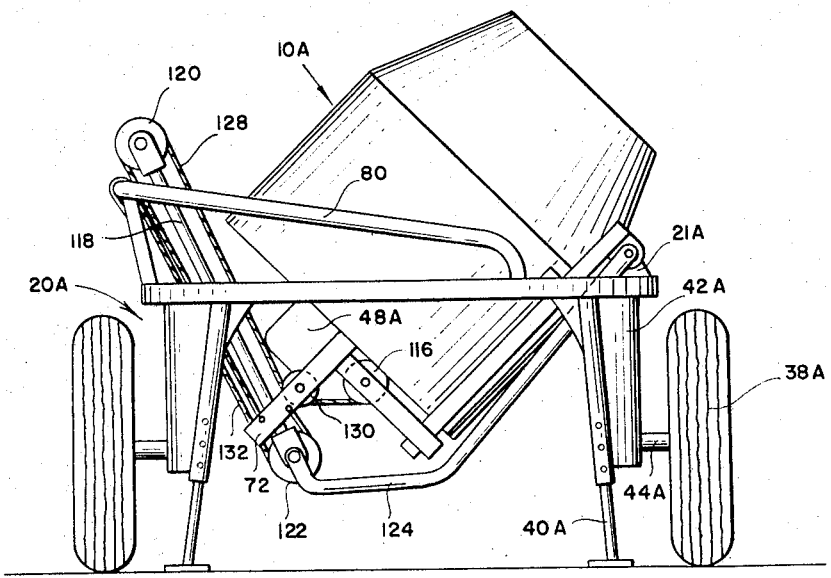
FIGURE 7 is a side elevation view of another embodiment of the invention.

In the embodiment just described the tilting of the cradle and its container is a manual operation. For heavier loads, or merely to facilitate operation, the tilting mechanism may be motor driven. Such an embodiment of the invention is illustrated in FIGURE 7. Container 10A may be the drum of a cement mixer similar to the container of FIGURE 1. Again the container is supported upon a cradle, 16A, which is in turn tiltably mounted at 21A upon the azimuthally rotatable turret ring 18A of the chassis 20A. As shown in FIGURES 8 and 12, the cradle may comprise a pair of longitudinal frame members 66, the frontal ends of which are pivotally supported upon the turret ring 18A for tilting movement about a generally horizontal axis 68. The opposite ends of members 66 are fixed to transverse frame members 70 which are inclined upwardly to meet another pair of longitudinal frame members 72. The mouth end of container 10A may be rotatably supported upon the cradle by means of rollers 22A rotatably supported upon the longitudinal frame members 66. The bottom end of the drum may be provided with a central arbor 76 (see FIGURE 9) for rotatably supporting the drum upon an extension of the cradle by means of a suitable bearing (not shown). As indicated in FIGURES 8 and 12, the side wall of the container is extended beyond the bottom, as in FIGURE 1, so that the drive motor and the drive train for axial rotation of the drum is recessed.

Figure 15:
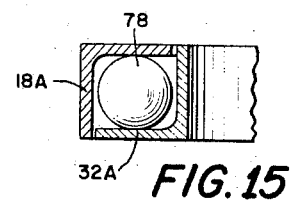
FIGURE 15 is an enlarged sectional view taken along line 15—15 of FIGURE 14 in the direction of the arrows.

The turret ring and the fixed ring 32A may have mating angle cross sections as shown in FIGURE 15 to provide desired compactness, rigidity, and lateral stability. Suitable bearings, such as balls 78, may be employed to support the turret ring for free rotation upon the fixed ring; the bearings may be caged or positioned in any other conventional manner between the complementary rings. The fixed ring may be supported upon wheels 32A by means of cylindrical triangular plates 42A and stub axles 44A similar to the corresponding elements of FIGURE 1. Adjustable leg supports 40A and braces 46A may also be provided. Turret ring 18A may have a circular rail 80 extending upwardly therefrom to facilitate azimuthal movement of the turret ring by hand.

In accordance with this embodiment of the invention the motor 48A for rotating the drum upon its axis is also utilized for tilting the cradle and the drum. One form of drive mechanism is illustrated in FIGURE 9. The cradle-supported motor drives a belt 82 which drives a pulley 84 fixed to a shaft 86 supported upon an eccentric 88 adjustably supported upon the cradle. A sprocket wheel 90 is also fixed to shaft 86 and drives a chain 92, which passes by a tensioning idler sprocket wheel 94 and drives a sprocket wheel 96 rotatably supported upon the cradle. Sprocket wheel 96 is fixed to a gear 98 which drives a ring gear 100 fixed within the drum extension. The ring gear may be formed economically in sectors which are assembled within and supported upon the interior of the drum extension.

Fixed to the pulley 84 is an internal friction wheel 102 and an external friction wheel 104. These friction wheels are selectively engageable with another friction wheel 106, by adjustment of the position of the eccentric 88. This may be accomplished, for example, by means of a control lever 108 (FIGURE 12), which may pass through one of the tubular frame members 66 and be connected by a conventional linkage to the eccentric. Friction wheel 106 is rotatably supported upon the cradle and may be turned in one direction or the other by engagement with one of the friction wheels 102 or 104, both wheels being shifted laterally in the same direction by means of the eccentric. If neither friction wheel 102 nor 104 engages friction wheel 106, the friction wheel 106 will remain stationary. Friction wheel 106 is fixed to a worm gear 110 which drives a worm wheel 112 fixed to a shaft 114 supported for rotation transversely on the cradle. A cable winding drum 116 is also fixed to shaft 114 and is rotated by the worm wheel. As will become apparent hereinafter, the cable winding drum 116 actuates a lifting mechanism at the rear of the cradle for tiltably moving the cradle. Because the worm gear 110 cannot be rotated by the wheel 112, the lifting mechanism is locked in any selected position when the worm gear is not driven. Because of the difference in diameter between friction wheels 102 and 104, a two-speed reversible drive is provided. The slow speed is preferably employed for lifting.

FIGURES 10 and 11 illustrate the construction and operation of one form of lifting mechanism in accordance with the invention. An important element of this mechanism is a cable tender 118, which may be a tubular pole of fixed length having a pulley 120 rotatably supported at the top thereof and a pulley 122 rotatably supported at the bottom thereof. In the form shown the bottom of the cable tender is pivotally supported upon one end of a lever 124. As illustrated in FIGURE 12 the lever may comprise a pair of arms which extend along the cradle and which may be pivotally supported upon the turret ring at their distal ends for tilting movement about the same axis as the cradle. The cable tender may be guided by passing between the longitudinal cradle members 72 and between a pair of transverse guide members 125 and 126 with sufficient play for free movement.

As shown in FIGURE 10, a first cable 128 is wound upon and extends from the cable winding drum 116, extends under and around a pulley 130 rotatably supported upon frame members 72, then upwardly along the pole 118, over and around pulley 120, then downwardly along the pole 118 to the frame members 72 of the cradle, where the end of the cable is fixed adjacent to guide member 126. A second cable 132 is fixed at one end to the turret ring 18A (for example, it may be attached to the rail 80) and extends downwardly along the pole 118, under and around pulley 122, and then upwardly along the pole to the frame members 72 of the cradle, where its ends are fixed adjacent to guide member 125. Cable 132 is of fixed length, while the length of cable 128 is effectively varied by operation of the winding drum 116. The term "cable" as used herein is intended to be generic to elongated flexible tension members regardless of the material from which the member is formed. Similarly, the term "pulley" is intended to be generic to cable guides whether of the rotatable wheel type or other appropriate type.

The operation of the lifting mechanism can be seen from a comparison of FIGURES 10 and 11. If the mechanism is in the position shown in FIGURE 10 and the winding drum 116 is rotated so as to wind cable 128 thereon, the cable is effectively shortened and is pulled over pulley 120 so as to lift the cradle and the winding drum. Upward movement of the cradle causes upward movement of the end of cable 132 fixed at 125, and because the length of this cable is fixed, the cable lifts pole 118 as the cable moves about the pulley 122, the bottom of the pole being supported upon the cable. The lifting of the pole creates additional lifting of the cradle through cradle 128, the net result being that the cradle is lifted twice the distance moved by cable 128 along its length. The cradle is lifted with respect to the pole and the pole is lifted with respect to the chassis, as clearly shown in FIGURE 11.

It is to be noted that the rigid cable tender is of fixed length and is guided so as to substantially maintain the same, approximately perpendicular, orientation with respect to the cradle. This is to be contrasted with hydraulic ram pylons employed for lifting, in which the rigid member must vary in length and is not free to follow the orientation of the load. The lifting mechanism of the invention is simple, efficient, lightweight, and low in cost. From the standpoint of efficiency it is also to be noted that the cable pull is maintained substantially parallel to the length of the cable tender throughout the major portion of the operating cycle, this aspect of the invention being improved even further in a modification described hereinafter.

Figure 13:
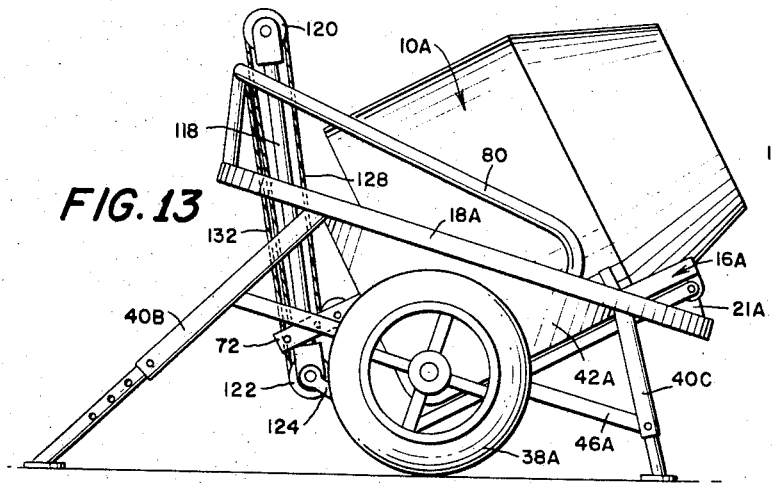
FIGURE 13 is a side elevation view illustrating another embodiment of the invention.
Figure 14:
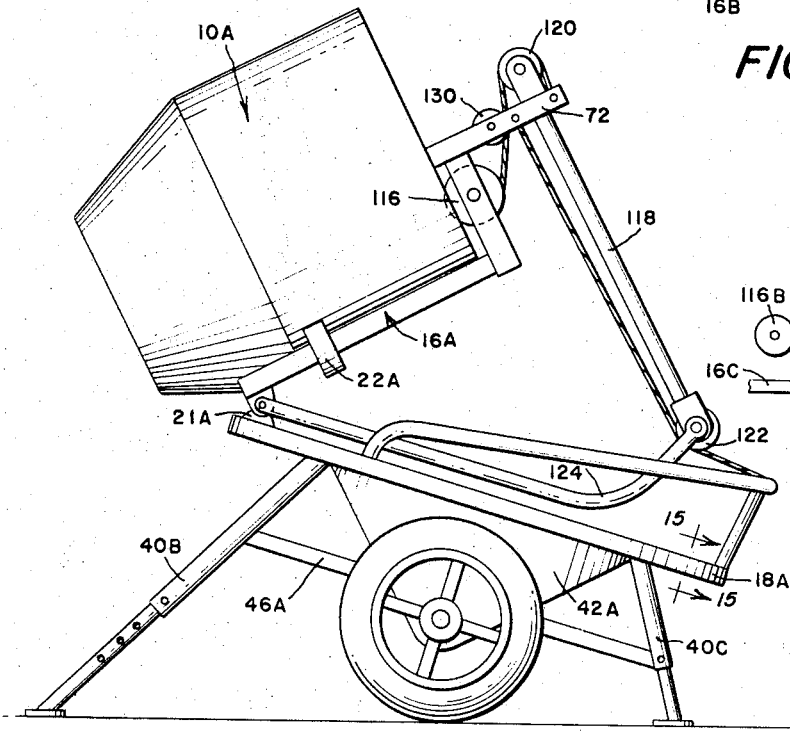
FIGURE 14 is a view similar to FIGURE 13 illustrating the apparatus in a different position.

FIGURES 13 and 14 illustrate another embodiment of the invention, which may have substantially the same construction as the embodiment of FIGURE 7, except that one pair of legs 40B is made longer than an opposite pair of legs 40C so that the turret ring is inclined with respect to the horizontal. One advantage of this construction is that a variety of filling and emptying heights for the container is provided. The container may be loaded at a relatively low level to minimize operator fatigue and unloaded at a relatively high level to accommodate receiver height, as can be seen from a comparison of FIGURES 13 and 14. Suitable stops well known to the art may be employed to fix the turret ring at any selected azimuthal position.

By properly positioning the center of gravity of the turret ring (including the structure supported thereon) with respect to the axis of rotation of the ring, it is possible to provide for automatic or minimal-effort movement of the ring between different azimuthal positions for loading and unloading, as indicated in FIGURES 13 and 14. Thus, if the center of gravity is shifted above the axis of azimuthal rotation of the ring when the container has been emptied in the position of FIGURE 14, the ring will rotate from the unloading azimuthal position of FIGURE 14 to the loading azimuthal position of FIGURE 13 automatically or with minimal effort. Similarly, if the center of gravity is shifted above the axis of rotation when the container has been filled in the position of FIGURE 13, the ring will rotate automatically or with minimal effort to the unloading azimuthal position of FIGURE 14. This type of operation may be attained by proper placement of the container relative to the turret ring, so that the center of gravity of the turret unit is shifted when the container is loaded or unloaded and may be facilitated by the use of additional ballast.

Figure 16:
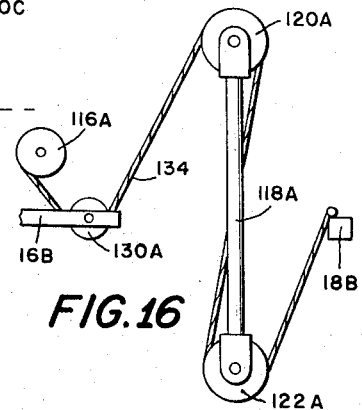
FIGURE 16 is a diagrammatic elevation view illustrating a modification of the lifting mechanism of the invention.

FIGURE 16 illustrates a modification of the lifting mechanism. In this embodiment a winding drum 116A is supported upon a cradle 16B as previously described, and a cable tender 118A has a pulley 120A at the top and a pulley 122A at the bottom. A cable 134 extends from the cable winding drum under and around a pulley 130A mounted on the cradle and then upwardly, over pulley 120A, downwardly to the opposite side of the cable tender, under pulley 122A and upwardly to the turret ring 18B, where the end of the cable is fixed. The cable tender "floats" upon the cable 134 but may be guided in the manner previously described, or in any other suitable manner. When drum 116A winds cable 134 the cable is effectively shortened, lifting the cradle and winding drum, as well as the cable tender, which is preferably lightweight relative to the cradle load.

Figure 17:
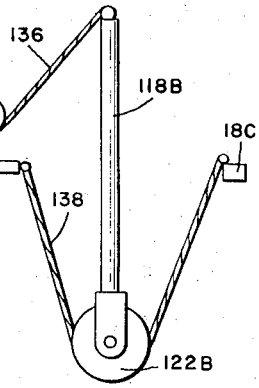
FIGURE 17 is a diagrammatic elevation view illustrating still another embodiment of the lifting mechanism.

FIGURE 17 illustrates another embodiment of the lifting mechanism. Here a winding drum 116B is mounted upon a cradle 16C. A cable tender 118B has a pulley 122B at its bottom. The top portion of the cable tender is connected to one end of a cable 136 wound upon the drum 116B. A second cable 138 is fixed at one end to the cradle 16C and passes downwardly under the pulley 122B and upwardly to the turret ring 18C, where the other end is fixed. Operation of the winding drum to wind up cable 136 raises the drum and the cradle, which in turn raises the cradle end of cable 138 and raises the cable tender 118B. This further raises the cradle. The cable tender may be suitably guided as described above.

In the embodiments of the lifting mechanism described above and in the embodiments to be described hereinafter the cradle may be looked upon as representing a load and the turret ring may be looked upon as representing a base with respect to which the load is to be lifted. The description of the different embodiments which follows employs such terminology. While the lifting mechanisms of the invention are especially suited for lifting tilting cradles in the environment shown and described, it is to be understood that the lifting mechanisms may be employed for lifting tiltable cradles or any other suitable load, which need not tilt or have other movements of the type set forth above.

FIGURE 21 illustrates a lifting mechanism employing a nut-driven screw, rather than a cable winding drum. A platform 140 supports a load 142 and a motor 144. The platform is supported by a nut 146 which rotates relative to the platform and which may be driven by a belt drive 148 from the motor. The nut meshes with and drives an elongated screw 150 which forms the cable tender. The lower end of the screw supports a pulley 152 which rotates independently of the screw. A cable 154 is fixed at one end to the platform and extends under the pulley 152 and upwardly to a base at 156, where the other end is fixed. Suitable guide means (not shown) may be provided for the lifting movement of the platform. When the motor 144 drives the nut 146, the nut and the platform advance along the screw as shown by the consecutive positions in FIGURE 21. The platform end of cable 154 is thus lifted, lifting the cable tender, which further lifts the platform.

In the foregoing embodiments of the lifting mechanism of the invention the drive motor is lifted along with the load. Embodiments will now be described in which the drive motor is not lifted with the load.

Figure 18:
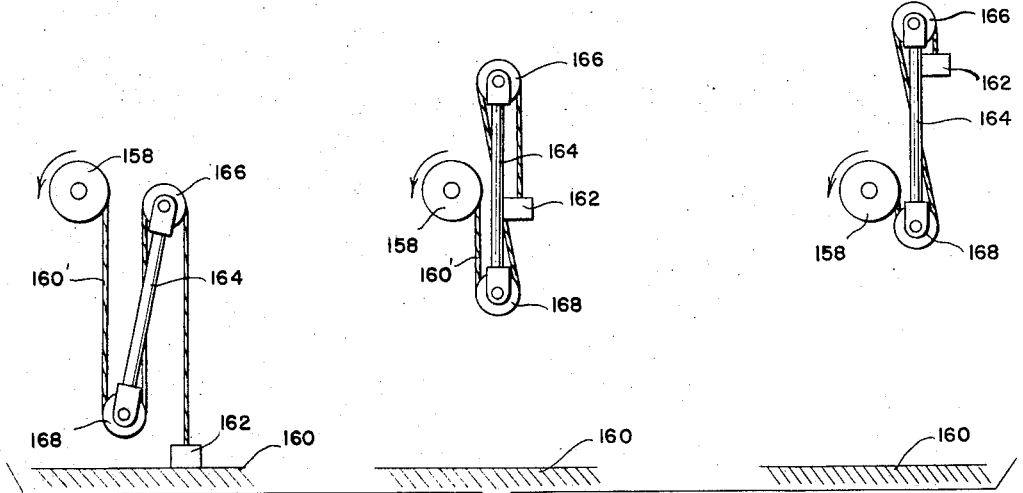

In FIGURE 18 the cable drive mechanism 158, which may be a winding drum, or merely a pulley over which a cable 160' passes to a remote winding drum, is supported above a base 160 from which a load 162 is to be lifted. A cable tender 164 has a pulley 166 at the top and a pulley 168 at the bottom. Cable 160' extends downwardly, under pulley 168, upwardly to the opposite side of the cable tender, over pulley 166, and downwardly to the load. The guide mechanism for the lifting movement of the cable tender is not shown. As can be seen from the consecutive positions in FIGURE 18, the cable tender, which is preferably lightweight compared to the load, is lifted relative to the base, and the load is lifted relative to the cable tender and the base.

Figure 19:
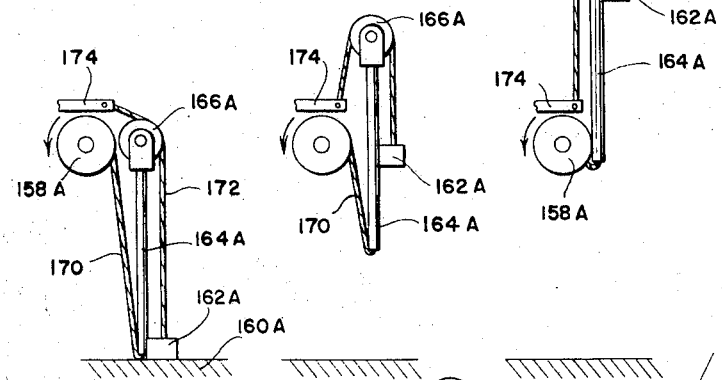

In the embodiment of FIGURE 19 the cable winding mechanism 158A (or pulley) is supported in the same relative position to the base 160A as shown in FIGURE 18. The cable tender 164A has a pulley 166A at the top. A first cable 170 extends from the winding mechanism downwardly and is fixed to the bottom of the cable tender. A second cable 172 is fixed at one end to a member 174 fixed relative to the base and at the other end to the load 162A. The consecutive positions in FIGURE 19 illustrate the manner in which winding of cable 170 lifts the cable tender, the load being additionally lifted by the action of cable 172.

Figure 20:
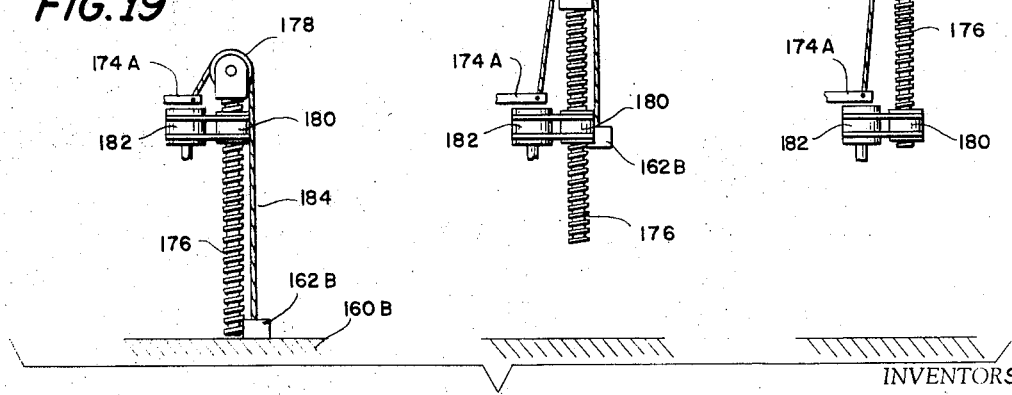

FIGURE 20 illustrates another modification employing an elongated screw which forms the cable tender. In this embodiment the screw 176 has a pulley 178 supported at the top thereof for rotation independent of the rotation of the screw. A feed nut is driven by any suitable means, such as a belt drive 182. A cable 184 is fixed at one end to a member 174A fixed relative to the base 160B, extends upwardly over the pulley 178 and then downwardly to the load 162B. Rotation of the feed nut causes lifting of the cable tender, and additional lifting of the load is obtained by virtue of the action of cable 184.

The embodiments of FIGURES 19 and 20 differ significantly from the other embodiments in that they lack a bottom pulley under which a cable passes. However, these embodiments can maintain the advantages of a fixed-length, rigid cable tender as previously described.

FIGURE 22 illustrates still another embodiment of the lifting mechanism. Here the cable winding mechanism 186 may be a cable winding drum or simply a pulley over which a cable 188 is trained in passing to a winding mechanism. A cable tender 190 has a pulley 192 at the top and a pulley 194 at the bottom. Cable 188 passes over a pulley 195, which could be the winding drum, then downwardly and under pulley 194, then upwardly to the other side of the cable tender, where the cable end is fixed to a member 196, which, like pulley 195, may be at a fixed height above a base 198. A second cable 200 has one end fixed to a member 196 and extends over pulley 192 and downwardly to the load 202. The winding of cable 188 causes lifting of the cable tender and additional lifting of the load, as illustrated in the consecutive views of FIGURE 22.

FIGURE 23 illustrates the manner in which a typical lifting mechanism, such as the type illustrated in FIGURE 22, may be utilized for lifting the dumping platform DP of a dump truck T, for example. It will be noted that the cable tender tilts toward the pivot axis p of the dumping platform as the platform is lifted.

Figure 24:
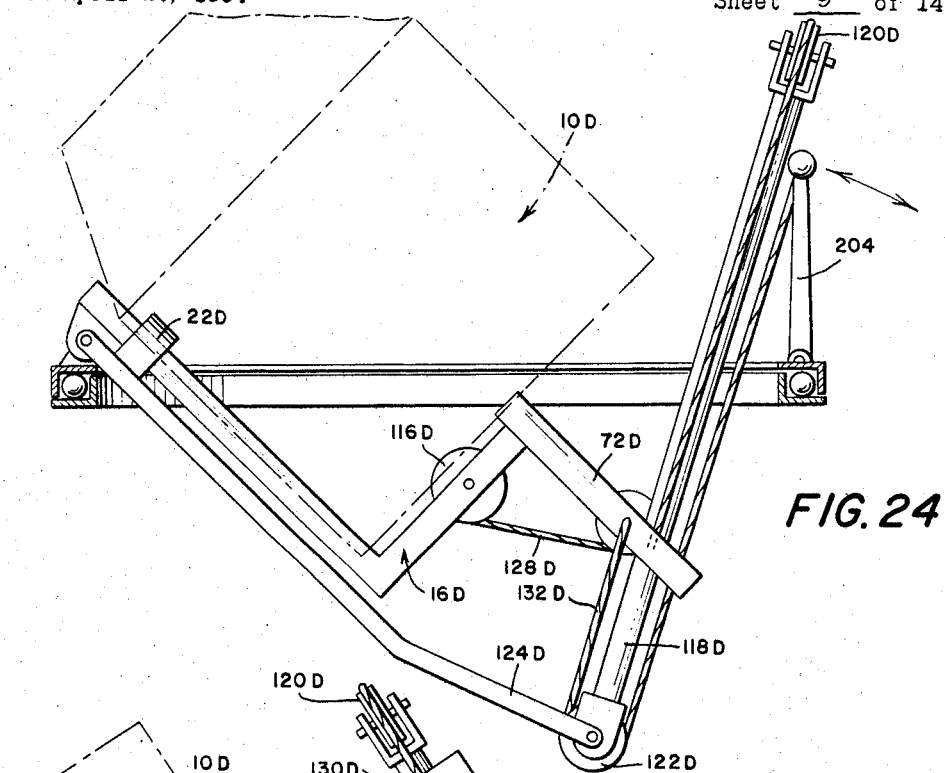
FIGURE 24 is a partially diagrammatic vertical sectional view illustrating another modification of the lifting mechanism of the invention in a first position.
Figure 25:
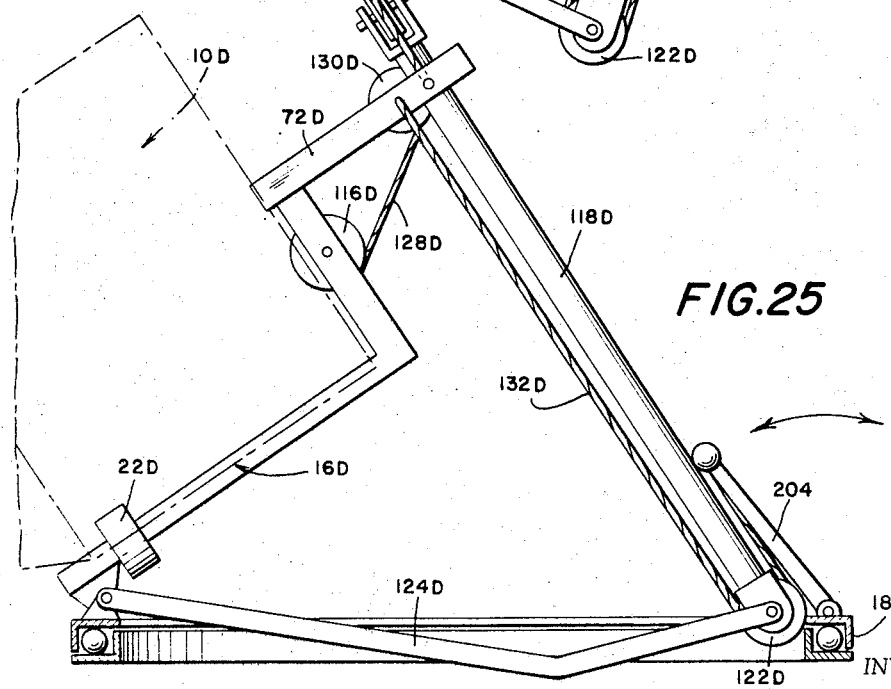
FIGURE 25 is a view similar to FIGURE 24 but illustrating the apparatus in a second position.

FIGURES 24 and 25 illustrate a modification of the cradle tilting mechanism previously described in connection with FIGURES 10 and 11. Here the cradle 16D is tiltably mounted upon a chassis ring 18D as before, and the cable tender 118D is pivotally connected at its lower end to a guide lever 124D, the distal end of which is tiltably supported upon the turret ring as before. The cable tender is also guided by the frame members 72D as previously described. The upper end of the cable tender has a pulley 120D, the orientation of which has been shifted 90° from the previous embodiment, and the lower end has a pulley 122D. Cable 128D extends from the winding drum 116D, under pulley 130D supported on the cradle, upwardly along the hidden side of the cable tender, over pulley 120D and then downwardly to where the end is fixed to the cradle. Cable 132D is fixed at one end to the cradle and then extends downwardly under pulley 122D and upwardly to the top portion of an arm 204, which is pivotally supported on the turret ring for movement about a generally horizontal axis. The top of the arm is urged against the cable tender by cable tension and may be provided with a roller if desired. From comparison of the positions shown in FIGURES 24 and 25 it will be apparent that arm 204 ensures that cable 132D is maintained substantially parallel to the cable tender throughout the operating cycle of the lifting mechanism.

FIGURES 26–32 illustrate a preferred embodiment of a cement mixer or the like in accordance with the invention. This embodiment is similar to previously described embodiments but incorporates certain refinements. The drum 10E is rotatably supported upon the tilting cradle 16E by means of the rollers 22E and the central bearing 24E. The chassis 20E is supported upon wheels 38E by means of the curved triangular plates 42E and the braces 46E, which in this case are connected to the fixed ring 32E by means of framing members 206, rather than being fixed to the legs. The turret ring 18E may be rotatably supported upon the fixed ring by means of balls or bearings 78E as shown in FIGURE 29, the angular cross-sectional configuration of the mating rings being varied from the previous configurations so that the vertical flange of the fixed ring is exterior and the vertical flange of the movable ring is interior. A rim member 208 extends downwardly from the turret ring so as to overlap the exterior surface of the vertical flange of the fixed ring. The turret ring may be provided with a hand rail 80E as before.

Figure 28:
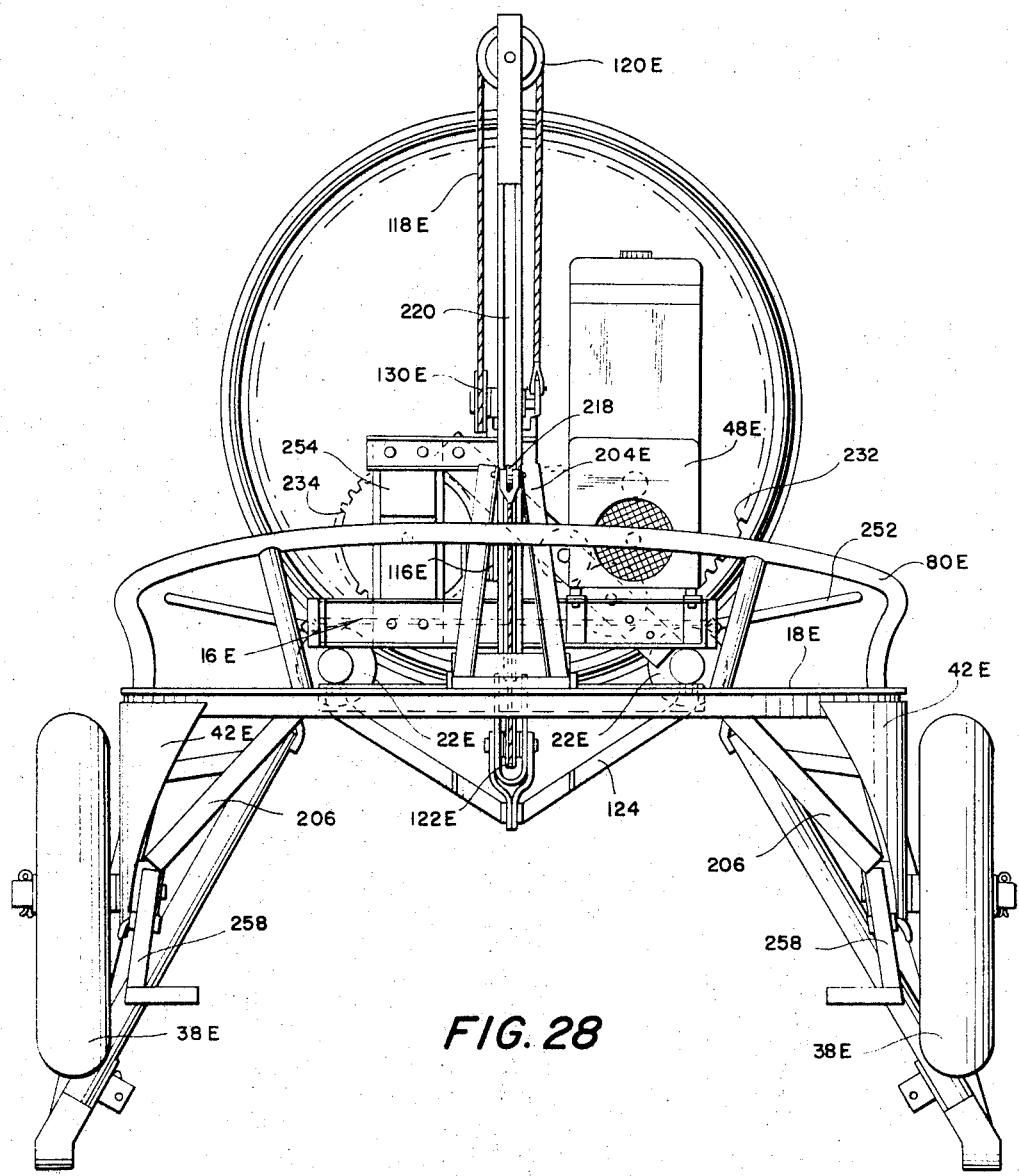
FIGURE 28 is a rear elevation view of the same embodiment.
Figure 32:
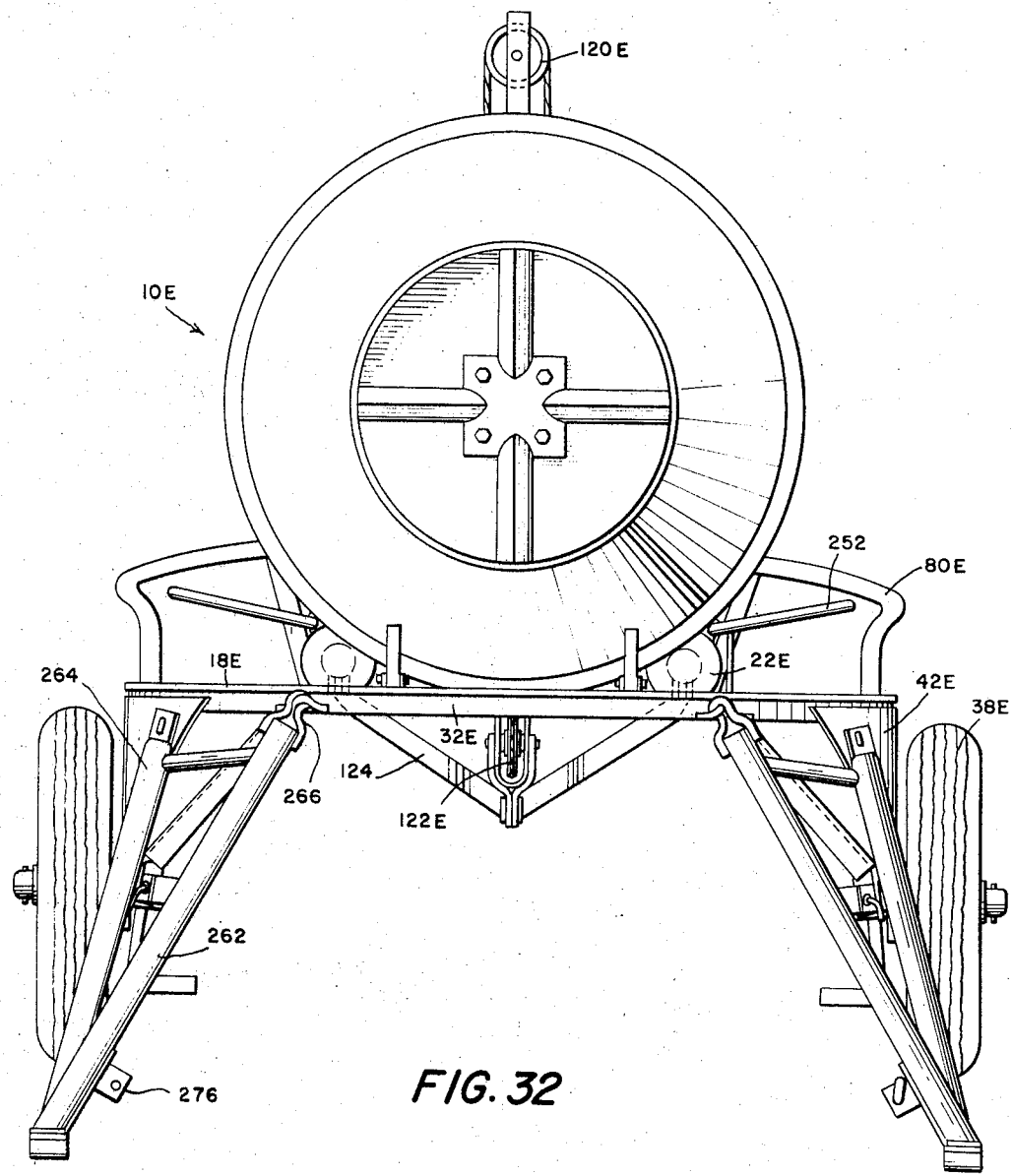
FIGURE 32 is a front elevation view of the embodiment of FIGURE 26.

As in the previous embodiments the interior of the chassis is kept free of obstructions so that the container is unencumbered in its tilting movement through the turret ring about the tilt axis of brackets 21E. The illustrated container has internal mixing blades or vanes 210 and an external circumferential track 212 upon which the rollers 22E move. The container is shown in a partially raised position, which may be used for over the road travel. The lifting mechanism is similar to the embodiment illustrated in FIGURES 24 and 25. A cable 128E extends from a winding drum 116E supported on the cradle, over a pulley 130E on the cradle, then upwardly and over a pulley 120E at the top of the cable tender 118E, and then downwardly along the cable tender to the cradle, where the end is fixed as shown in FIGURE 28. Another cable, 132E, is fixed at one end to the cradle and extends downwardly under pulley 122E at the bottom of the cable tender, and then upwardly along the cable tender to the top portion of arm 204E, which is pivotally mounted on the turret ring at 216. A roller 218 at the top of the arm moves along a track 220 at the rear of the cable tender. The lower end of the cable tender is pivotally connected to one end of a lever 124E, which is pivotally connected at its distal end to the turret ring (see FIGURE 28). In this case the pivotal axis of lever 124E is behind the pivotal axis of the cradle.

The drive motor for rotation of the drum about its axis and for selective tilting of the cradle may be a gasoline engine 48E supported upon the rear portion of the cradle. As best seen in FIGURE 30, the drive pinion 222 of the motor meshes with a gear 224 fixed to a shaft 226 which rotates upon the cradle. A gear 228 is also fixed to the shaft and drives a gear 230 rotatably supported on the cradle, which in turn drives a ring gear 232 fixed within an extension of the side wall of the drum as previously described.

For selective operation of the lifting mechanism, gear 224 meshes with another gear 234 having an internal friction wheel 236 fixed thereto. Gear 234, friction wheel 236, and an external friction wheel 238 are all fixed upon the same shaft 240 (FIGURE 31) supported upon an eccentric 242 (see FIGURE 31A). A pair of friction wheels 244 and 246 is fixed to a shaft 248 rotatably supported upon the cradle. By turning the eccentric, friction wheels 236 and 238 may be shifted laterally in unison, so as to engage friction wheel 238 with friction wheel 246 or to engage friction wheel 244 with friction wheel 236. Shaft 248 may thus be driven in one direction or the other at a speed depending upon which wheels are engaged. The eccentric may be moved by any suitable linkage (FIGURE 30) operated by handles 252 (FIGURE 27) at the front of the apparatus.

Shaft 248 drives a gear reduction unit 254 (FIGURES 27 and 28) the orthogonal output of which drives the winding drum 116E. The winding drum may be of a variable diameter type so as to equalize the load.

In accordance with another feature of this embodiment of the invention, the apparatus is provided with a pair of front legs 256 and a pair of rear legs 258 of different height, so as to provide for tilting of the chassis. In the position shown in FIGURE 26 the legs engage the ground for stabilizing the chassis. For over-the-road travel, locks 260 may be released, so that the rear legs may be turned upwardly. The front legs may be converted to a trailer hitch.

Figure 26:
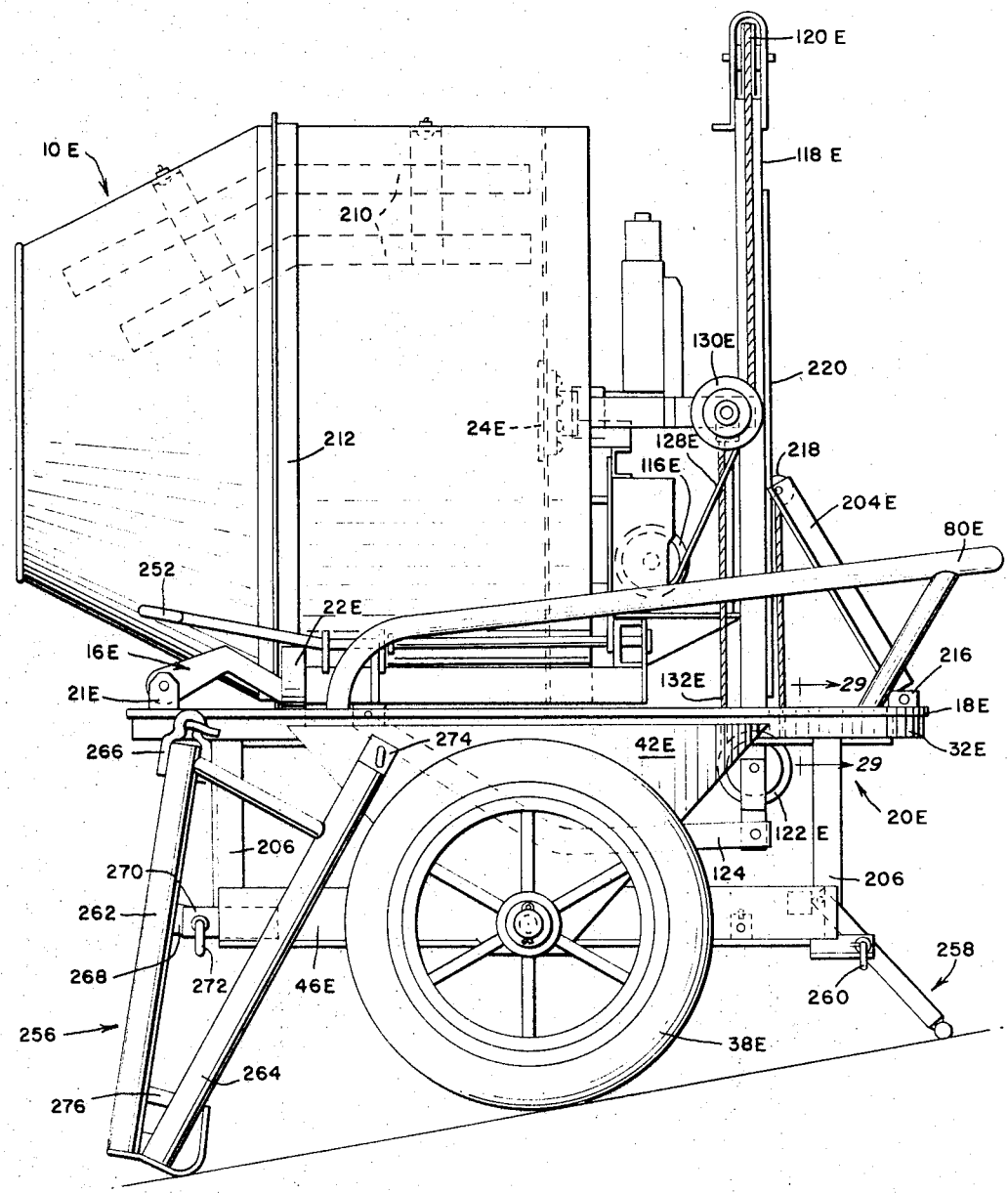
FIGURE 26 is a side elevation view of a preferred form of concrete mixer in accordance with the invention.
Figure 27:
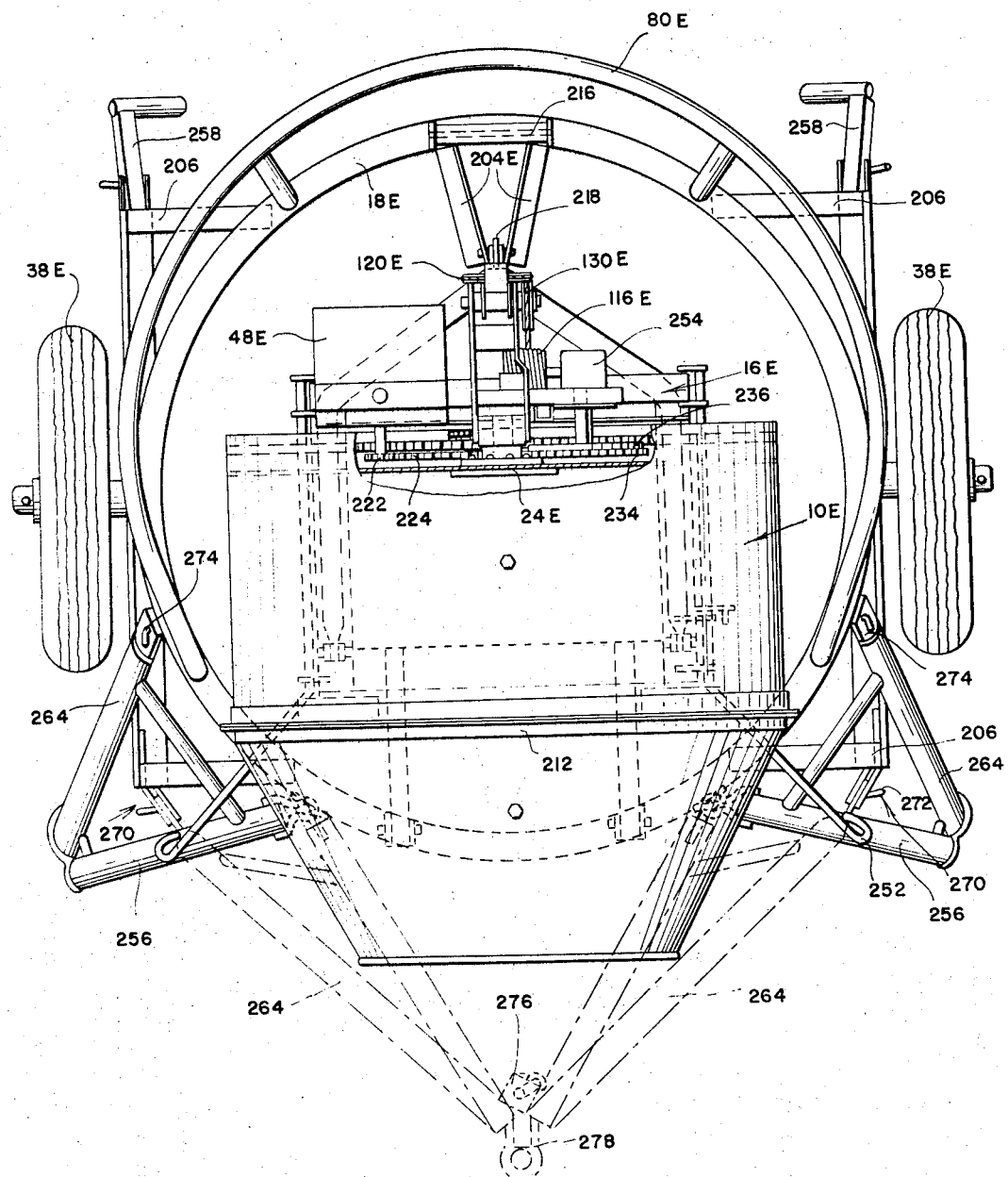
FIGURE 27 is a plan view, partially broken away, of the embodiment of FIGURE 26.

The front legs are preferably V-shaped. As shown in FIGURE 26 each leg has a pair of branches 262, 264. The top 266 of the front branch is loosely pivoted to the chassis. In the ground-engaging position illustrated in FIGURE 26 branch 262 has its intermediate ear 268 releasably locked between a pair of parallel bracket plates 270 by means of a pin 272. To form the front legs into a trailer hitch the pins 272 are withdrawn so that the front legs may be pivoted to the phantom line position shown in FIGURE 27, at which ears 274 at the tops of branches 264 are pinned to the bracket plates 270, the angle of the ears being chosen for proper converging orientation of the front legs as shown in FIGURE 27. Ears associated with foot plates 276 (see FIGURE 32) are then pinned to a trailer hitch member 278 which may be secured to a towing vehicle in the well known manner.

While preferred embodiments of the invention have been shown and described, it will be apparent to those skilled in the art that changes can be made in these embodiments, without departing from the principles and spirit of the invention, the scope of which is defined in the appended claims. For example, the drum may be driven by means of the supporting rollers at the front of the drum or by means of additional friction rollers at the rear, internal of the drum extension or external of the drum. A polygonal container may be employed instead of a cylindrical one. An azimuthal motor drive may be provided. Certain features of the invention may be utilized with a tilt motor on the turret or, where there is no azimuthal movement, on the fixed chassis. In some instances, as where azimuthal movement is not desired, the chassis may be other than circular. Multiple cable tender poles may be used. The cable tender may have a curvature centered on the tilt axis to permit a simple non-pivoting guide. Moreover, the cable tender may slide in two orientable rings, one secured to the cradle and one to the turret. Accordingly, the foregoing embodiments are to be considered illustrative, rather than restrictive of the invention, and those modifications which come within the meaning and range of equivalency of the claims are to be included therein.

The invention claimed is:

1. Apparatus of the type described comprising a container having a mouth, a supporting chassis having an interior opening, said chassis having a first portion supported above a ground plane and a second portion rotatable in azimuth upon said first portion, means for supporting said container on said second portion for tiltable movement about an axis adjacent to said mouth between a lower, loading position, at which the container is suspended through said opening with the bottom of the container near said ground plane and an upper, unloading position, at which the bottom of the container is relatively remote from said ground plane.

2. The apparatus of claim 1, said chassis portions being ring-shaped.

3. The apparatus of claim 1, said chassis being substantially entirely open at its interior.

4. The apparatus of claim 1, said container comprising a drum supported upon said chassis for rotation about its own axis.

5. The apparatus of claim 1, said container being mounted upon said chassis by means of a cradle which tilts relative to said chassis and upon which said container is mounted for rotation.

6. The apparatus of claim 5, said cradle having rollers supporting said container adjacent to the mouth and having a central bearing for supporting the bottom of the container for rotation.

7. The apparatus of claim 6, said container having a wall extension beyond said central bearing and having rotation drive means supported upon said cradle and shielded by said wall extension.

8. The apparatus of claim 1, further comprising handle means for tilting said container relative to said chassis and spring means for biasing said container toward an inverted position.

9. The apparatus of claim 1, said second chassis portion comprising an inclined ring whereby material may be loaded and unloaded through the mouth of said container at different heights depending upon the azimuthal orientation of said ring.

10. The apparatus of claim 9, the center of gravity of said ring and the elements supported thereon being above the axis of rotation of said ring when said container is empty at an elevated unloading position and above the axis of rotation of said ring when container is full at a lowered loading position, whereby said ring may readily turn to raise the level of the loaded container and lower the level of the unloaded container.

11. Apparatus of the type described, comprising a container having a mouth, a supporting chassis having an interior opening, and means for supporting said container on said chassis for tiltable movement through said opening about an axis adjacent to said mouth, said container being mounted upon said chassis by means of a cradle which tilts relative to said chassis, a motor supported on said cradle, and means driven by said motor for tilting said cradle.

12. The apparatus of claim 11, said container having a rotatable member driven by said motor.

13. The apparatus of claim 11, wherein said container is a rotatable drum driven by said motor.

14. Apparatus of the type described comprising a chassis having a turret rotatable in azimuth and having means for supporting said turret above a ground plane, the interior of said turret being substantially fully open, a container mounted upon said turret for tilting movement about a generally horizontal axis between a lowered position in which said container is suspended through said turret and a raised position in which said container is inverted above said turret.

15. The apparatus of claim 14, said supporting means for said chassis comprising a pair of wheels at opposite sides of said chassis, said chassis having a ring upon which said turret rotates and having means extending downwardly from said ring and supporting stub axis upon which said wheels are rotatably mounted, whereby full interior chassis clearance is maintained for tilting movement of said container.

16. The apparatus of claim 15, said chassis further comprising adjustable mounting legs extending downwardly from said ring and connected by braces to said stub shaft supporting means.

17. Apparatus of the type described comprising a supporting chassis having an open ring rotatable in azimuth, a cradle mounted upon said ring for tilting movement through said open ring about a generally horizontal axis, a motor mounted upon said cradle, and a cradle tilting mechanism driven by said motor for lifting said cradle and said motor.

18. The apparatus of claim 17, said cradle supporting a container having a rotatable member driven by said motor.

19. Apparatus of the type described comprising a supporting chassis having a turret ring rotatable in azimuth through 360°, a cradle tiltably mounted upon said turret ring for movement through said ring, a container supported upon said cradle and having a mouth at the top of said container adjacent the tilting axis of said cradle, the bottom of said container depending through said ring when said cradle is in a lower position, said container being inverted when said cradle is in an upper position, the space above and below said ring being free to permit movement of said container in azimuth and in elevation, and means adjacent to the bottom of said container for tilting said cradle.

20. Apparatus of the type described comprising a supporting chassis having a cradle tiltably mounted thereon adjacent to one end of the cradle, and lifting means adjacent to the other end of said cradle, said lifting means comprising a drive motor mounted upon said cradle and a cable secured to said cradle and pulled in response to operation of said drive motor, said cradle having supported thereon a winding drum for said cable, said drum being driven by said motor, said lifting means comprising a pole with a pulley at one end, said cable being trained over said pulley, said pole having an arm pivotally supporting said pole with respect to said chassis.

21. The apparatus of claim 20, said lifting means comprising means for lifting said pole relative to said chassis while said cradle is lifted relative to said pole.

22. The apparatus of claim 20, said cradle having guide means for guiding the movement of said pole.

23. Apparatus of the type described comprising a supporting chassis having a cradle tiltably mounted thereon adjacent to one end of the cradle, and lifting means adjacent to the other end of said cradle, said lifting means comprising a drive motor mounted upon said cradle and a cable secured to said cradle and pulled in response to operation of said drive motor, said cradle having supported thereon a winding drum for said cable, said drum being driven by said motor, said lifting means comprising a pole having a pulley at the top and bottom thereof, said cable extending from said winding drum over the pulley at the top of said pole and then being fixed to said cradle, and a second cable extending from said cradle under and around said pulley at the bottom of said pole, and then fixed to said chassis.

24. The apparatus of claim 23, further comprising an additional pulley mounted on said cradle and training said first cable substantially parallel to said pole.

25. Apparatus of the type described comprising a supporting chassis having a cradle tiltably mounted thereon adjacent to one end of the cradle, and lifting means adjacent to the other end of said cradle, said lifting means comprising a drive motor mounted upon said cradle and a cable secured to said cradle and pulled in response to operation of said drive motor, said cradle having supported thereon a winding drum for said cable, said drum being driven by said motor, said lifting means comprising a pole having a pulley at the top and at the bottom thereof, said cable extending from said winding drum over and around the top pulley, under and around the bottom pulley, and then being fixed to said chassis.

26. The apparatus of claim 25, there being an intermediate pulley supported on said cradle between said winding drum and said top pulley.

27. Apparatus of the type described comprising a supporting chassis having a cradle tiltably mounted thereon adjacent to one end of the cradle, and lifting means adjacent to the other end of said cradle, said lifting means comprising a drive motor mounted upon said cradle and a cable secured to said cradle and pulled in response to operation of said drive motor, said cradle having supported thereon a winding drum for said cable, said drum being driven by said motor, said lifting means comprising a pole having a pulley at the bottom thereof, said cable extending from said winding drum to the top of said pole, and a second cable extending from said cable, down and around said pulley, and then fixed to said chassis.

28. Apparatus of the type described, comprising a chassis supported on wheels for mobility and having at least a pair of legs for stabilizing said chassis at a chosen site, and means for coupling said legs to said chassis for movement between a lowered position in which the legs engage the ground and a raised position in which the legs converge to form a trailer hitch, each of said legs being V-shaped with the top of one branch of each leg having a pivotal connection to the chassis and the top of the other branch of each leg having means for selectively connecting the branch to the chassis at a point below said pivoted connection, with the legs extending forwardly.

29. The apparatus of claim 28, the first-mentioned branch of each leg having means intermediate its length for selectively connecting it to said chassis at said point with said legs extending downwardly.

References Cited

UNITED STATES PATENTS

| | | | |
|---|---|---|---|
| 864,784 | 9/1907 | Hanitzsch | 259—74 X |
| 866,056 | 9/1907 | Parker | 259—177 X |
| 900,979 | 10/1908 | Brown | 298—21 X |
| 922,112 | 5/1909 | Edmondson | 259—171 |
| 1,048,317 | 12/1912 | Johnson | 259—171 |
| 1,413,309 | 4/1922 | Wooldridge | 298—21 |
| 1,453,634 | 5/1923 | Martin et al. | 259—177 |
| 1,514,248 | 11/1924 | Bergman | 15—340 X |
| 1,564,180 | 12/1925 | Willard | 259—171 |
| 1,803,360 | 5/1931 | Sherburne | 298—21 |
| 1,842,986 | 1/1932 | King | 298—10 |
| 2,848,241 | 8/1958 | Hubbard | 280—475 X |
| 1,943,325 | 1/1934 | Knowles | 259—177 |
| 2,608,395 | 8/1952 | August | 259—161 |
| 2,656,164 | 10/1953 | Knowlton | 259—171 |
| 3,066,919 | 12/1962 | Waimer et al. | 259—160 |

FOREIGN PATENTS 943,457  5/1956  Germany.

ROBERT W. JENKINS, *Primary Examiner.*

U.S. Cl. X.R.

259—177; 254—189; 280—186, 475